(12) United States Patent
Otsuka et al.

(10) Patent No.: US 7,406,409 B2
(45) Date of Patent: Jul. 29, 2008

(54) SYSTEM AND METHOD FOR RECORDING AND REPRODUCING MULTIMEDIA BASED ON AN AUDIO SIGNAL

(75) Inventors: Isao Otsuka, Nagaokakyo (JP); Ajay Divakaran, Burlington, MA (US); Masaharu Ogawa, Neyagawa (JP); Kazuhiko Nakane, Hyogo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 903 days.

(21) Appl. No.: 10/779,105

(22) Filed: Feb. 13, 2004

(65) Prior Publication Data

US 2005/0154973 A1   Jul. 14, 2005

Related U.S. Application Data

(63) Continuation-in-part of application No. 10/757,138, filed on Jan. 14, 2004.

(51) Int. Cl.
| | |
|---|---|
| *G10L 19/14* | (2006.01) |
| *G10L 11/00* | (2006.01) |
| *G10L 21/00* | (2006.01) |
| *G10L 21/06* | (2006.01) |
| *H04N 5/91* | (2006.01) |
| *G06F 3/00* | (2006.01) |
| *G06F 3/16* | (2006.01) |
| *G06F 13/00* | (2006.01) |

(52) U.S. Cl. .................. 704/211; 704/276; 386/46; 386/68; 715/719; 715/727; 725/46

(58) Field of Classification Search .................. 704/211, 704/270, 276; 725/46; 715/719, 727; 389/68
See application file for complete search history.

(56) References Cited

U.S. PATENT DOCUMENTS 5,649,060 A * 7/1997 Ellozy et al. ................. 704/278

(Continued)

OTHER PUBLICATIONS

Jiang et al, "video segmentation with the assistance of audio content analysis", IEEE ICME, 2000, col. 3, pp. 1507-1510.*
Huang et al, "Automated Generation of News Content Hierarchy by Integrating Audio, Video and Text Infromation", IEEE International Conference on Acoustics, Speech and Signal Processing, 1999, col. 6, pp. 3025-3028.*

*Primary Examiner*—Dorothy S Siedler
(74) *Attorney, Agent, or Firm*—Dirk Brinkman; Clifton D. Mueller; Gene V. Vinokur (57) ABSTRACT

A system and method summarizes multimedia stored in a compressed multimedia file partitioned into a sequence of segments, where the content of the multimedia is, for example, video signals, audio signals, text, and binary data. An associated metadata file includes index information and an importance level for each segment. The importance information is continuous over as closed interval. An importance level threshold is selected in the closed interval, and only segments of the multimedia having a particular importance level greater than the importance level threshold are reproduced. The importance level can also be determined for fixed-length windows of multiple segments, or a sliding window. Furthermore, the importance level can be weighted by a factor, such as the audio volume.

10 Claims, 12 Drawing Sheets

U.S. PATENT DOCUMENTS

| | | | |
|---|---|---|---|
| 6,185,527 B1 * | 2/2001 | Petkovic et al. | 704/231 |
| 6,366,293 B1 * | 4/2002 | Hamilton et al. | 345/649 |
| 6,434,520 B1 * | 8/2002 | Kanevsky et al. | 704/243 |
| 6,463,444 B1 * | 10/2002 | Jain et al. | 707/104.1 |
| 6,628,892 B2 | 9/2003 | Tsumagari et al. | 386/95 |
| 2002/0157095 A1 * | 10/2002 | Masumitsu et al. | 725/46 |
| 2004/0008789 A1 * | 1/2004 | Divakaran et al. | 375/240.26 |

* cited by examiner

SYSTEM AND METHOD FOR RECORDING AND REPRODUCING MULTIMEDIA BASED ON AN AUDIO SIGNAL

RELATED APPLICATION

This application is a Continuation in Part of a U.S. patent application titled "System and Method for Recording and Reproducing Multimedia," Ser. No. 10/757,138, filed on Jan. 14, 2004 by Otsuka, et al.

FIELD OF THE INVENTION

This invention relates generally to processing multimedia, and more particularly to recording video signals, audio signals, text, and binary data on storage media, and for reproducing selected portions of the multimedia.

BACKGROUND OF THE INVENTION

In order to quickly review and analyze a video, for example a movie, a recorded sporting event or a news broadcast, a summary of the video can be generated. A number of techniques are known for summarizing uncompressed and compressed videos.

The conventional practice is to first segment the video into scenes or 'shots', and then to extract low and high level features. The low level features are usually based on syntactic characteristics such as color, motion, and audio components, while the high level features capture semantic information.

The features are then classified, and the shots can be further segmented according to the classified features. The segments can be converted to short image sequences, for example, one or two seconds 'clips' or 'still' frames, and labeled and indexed. Thus, the reviewer can quickly scan the summary to select portions of the video to playback in detail. Obviously, the problem with such summaries is that the playback can only be based on the features and classifications used to generate the summary.

In order to further assist the review, the segments can be subjectively rank ordered according to a relative importance. Thus, important events in the video, such as climactic scenes, or goal scoring opportunities can be quickly identified, see, Fujiwara et al. "Abstractive Description of Video Using Summary DS," Point-illustrated Broadband+Mobile Standard MPEG Textbook, ASCII Corp., p. 177 FIGS. 5-24 Feb. 11, 2003, also "ISO/IEC 15938-5:2002 Information technology—Multimedia content description interface—Part 5: Multimedia Description Schemes," 2002. After an important video segment has been located, the viewer can use fast-forward or fast-reverse capabilities of the playback device to view segments of interest, see "DVR-7000 Instruction Manual," Pioneer Co., Ltd., p. 49, 2001.

Another technique for summarizing a news video uses motion activity descriptors, see U.S. patent application Ser. No. 09/845,009, titled "Method for Summarizing a Video Using Motion Descriptors," filed by Divakaran, et al., on Apr. 27, 2001. A technique for generating soccer highlights uses a combination of video and audio features, see U.S. patent application Ser. No. 10/046,790, titled "Summarizing Videos Using Motion Activity Descriptors Correlated with Audio Features," filed by Cabasson, et al., on Jan. 15, 2002. Audio and video features can also be used to generate highlights for news, soccer, baseball and golf videos, see U.S. patent application Ser. No. 10/374,017, titled "Method and System for Extracting Sports Highlights from Audio Signals," filed by Xiong, et al., on Feb. 25, 2003. Those techniques extract key segments of notable events from the video, such a scoring opportunity or an introduction to a news story. The original video is thus represented by an abstract that includes the extracted key segments. The key segments can provide entry points into the original content and thus allow flexible and convenient navigation.

There are a number of problems with prior art video recording, summarization and playback. First, the summary is based on some preconceived notion of the extracted features, classifications, and importance, instead of those of the viewer. Second, if importance levels are used, the importance levels are usually quantized to a very small number of levels, for example, five or less. More often, only two levels are used, i.e., the interesting segments that are retained, and the rest of the video that is discarded.

In particular, the hierarchical description proposed in the MPEG-7 standard is very cumbersome if a fine quantization of the importance is used because the number of levels in the hierarchy becomes very large, which in turn requires management of too many levels.

The MPEG-7 description requires editing of the metadata whenever the content is edited. For example, if a segment is cut out of the original content, all the levels affected by the cut need to be modified. That can get cumbersome quickly as the number of editing operations increases.

The importance levels are highly subjective, and highly context dependent. That is, the importance levels for sports videos depend on the particular sports genre, and are totally inapplicable to movies and news programs. Further, the viewer has no control over the length of the summary to be generated.

The small number of subjective levels used by the prior art techniques make it practically impossible for the viewer to edit and combine several different videos based on the summaries to generate a derivate video that reflects the interests of the viewer.

Therefore, there is a need to record and reproduce a video in a manner that can be controlled by the viewer. Furthermore, there is a need for specifying importance levels that are content independent, and not subjective. In addition, there is a need to provide more than a small number of discrete importance levels. Lastly, there is a need to enable the viewer to generate a summary of any length, depending on a viewer-selected level of importance.

SUMMARY OF THE INVENTION

A system and method summarizes multimedia stored in a compressed multimedia file partitioned into segments.

An associated metadata file includes index information and importance level information for each segment in the sequence. In a preferred embodiment, the files are stored on a storage medium such as a DVD.

The importance information is continuous over a closed interval. An importance level threshold, or range, is selected in the closed interval. The importance level can be viewer selected, and based on the audio signal, for example, an audio classification and/or an audio volume.

When the files are read, only segments of the multimedia having a particular importance level greater than the importance level threshold are reproduced.

To further improve the accuracy of the summarization, the importance level can be based on windows of segments. In this case, the content can be partitioned into windows of fixed length, or a sliding window.

DETAILED DESCRIPTION OF THE PREFERRED EMBODIMENT

Reproducing System Structure

Figure 1:
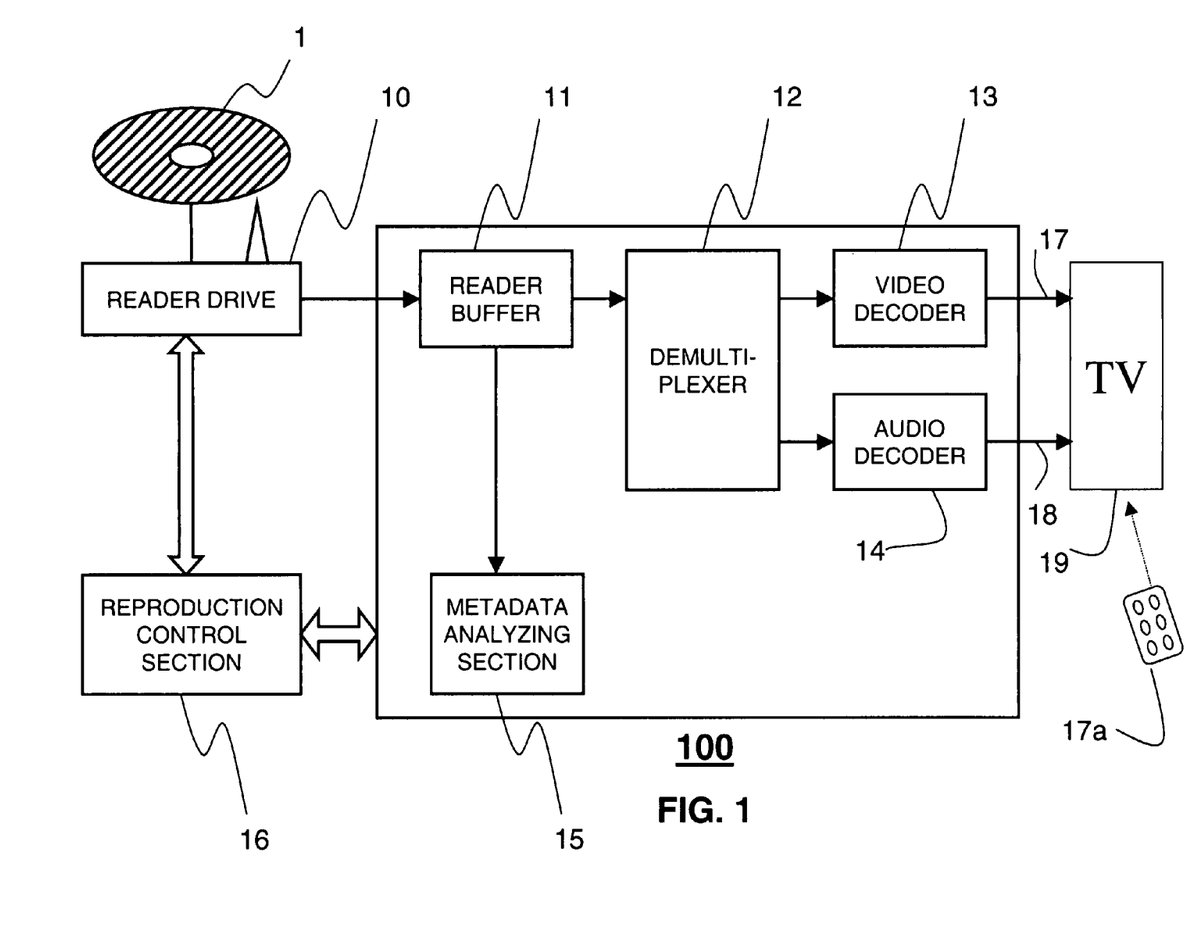
FIG. 1 is a block diagram of a system for reproducing multimedia according to the invention.

FIG. 1 shows a system 100 for reproducing multimedia, where the content of the multimedia is, for example, video signals, audio signals, text, and binary data. The system includes a storage media 1, such as a disc or tape, for persistently storing multimedia and metadata organized as files in directories. In the preferred embodiment, the multimedia is compressed using, e.g., MPEG and AC-3 standards. The multimedia has been segmented, classified, and indexed using known techniques. The indexing can be based on time or frame number, see U.S Pat. No. 6,628,892, incorporated herein by reference.

The metadata includes index and importance information. As an advantage of the present invention, and in contrast with the prior art, the importance information is continuous over a closed interval, e.g., [0, 1] or [0, 100]. Therefore, the importance level, is not in terms of 'goal' or 'head-line-news-time', but rather a real number, e.g., the importance is 0.567 or +73.64.

As an additional advantage, the continuous importance information is context and content independent, and not highly subjective as in the prior art. Both of these features enable a viewer to reproduce the multimedia to any desired length.

The metadata can be binary or text, and if necessary, protected by encryption. The metadata can include file attributes such as dates, validity codes, file types, etc. The hierarchical file and directory structure for the multimedia and metadata are described with respect to FIG. 2.

As shown in FIG. 1, a reader drive 10 reads the multimedia and metadata files from the storage media 1. A read buffer 11 temporarily stores data read by the reader drive 10. A demultiplexer 12 acquires, sequentially, multimedia data from the read buffer, and separates the multimedia data into a video stream and an audio stream.

A video decoder 13 processes a video signal 17, and an audio decoder 14 processes the audio signal 18 for an output device, e.g., a television monitor 19.

A metadata analyzing section 15 acquires sequentially metadata from the read buffer 11. A reproduction control section 16, including a processor, controls the system 100. The functionality of the metadata analyzing section 15 can be implemented with software, and can be incorporated as part of the reproduction control section 16.

It should be noted that for any implementation described herein the multimedia files and the metadata files do not need to be recorded and reproduced concurrently. In fact, the metadata file can be analyzed independently to enable the viewer to quickly locate segments of interest in the multimedia files. In addition, the multimedia and the metadata can be multiplexed into a single file, and demultiplexed when read.

File and Directory Structure

Figure 2:
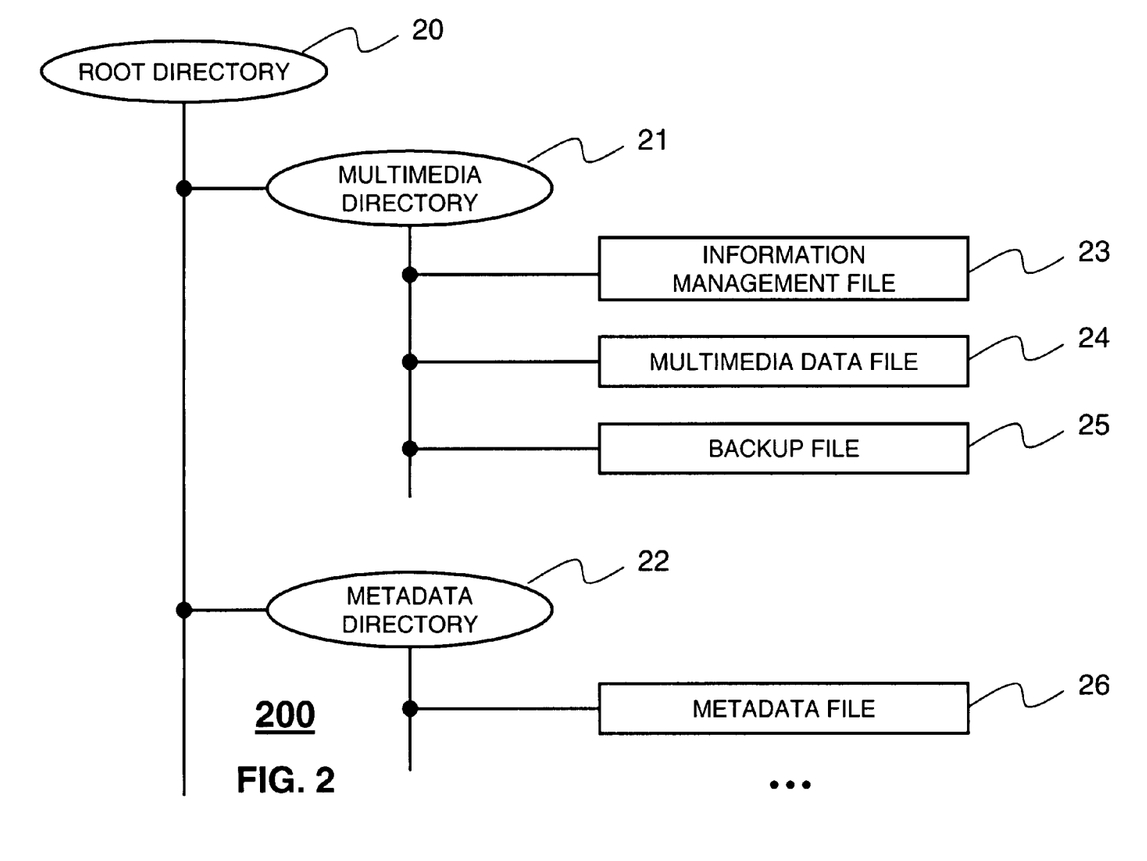
FIG. 2 is a block diagram of a file structure for multimedia according to the invention.

FIG. 2 shows the hierarchical structure 200 of the files and directories stored on the media 1. A root directory 20 includes a multimedia directory 21 and a metadata directory 22. The multimedia directory 21 stores information management files 23, multimedia files 24, and backup files 25. The metadata directory 22 stores metadata files 26. It should be noted that other directory and file structures are possible. The data in the multimedia files 24 contains the multiplexed video and/or audio signals.

Note that either the information management files 23 and/or the multimedia data files 24 can includes flags indicating the presence or absence or invalidity of the metadata.

Metadata Structure

Figure 3:
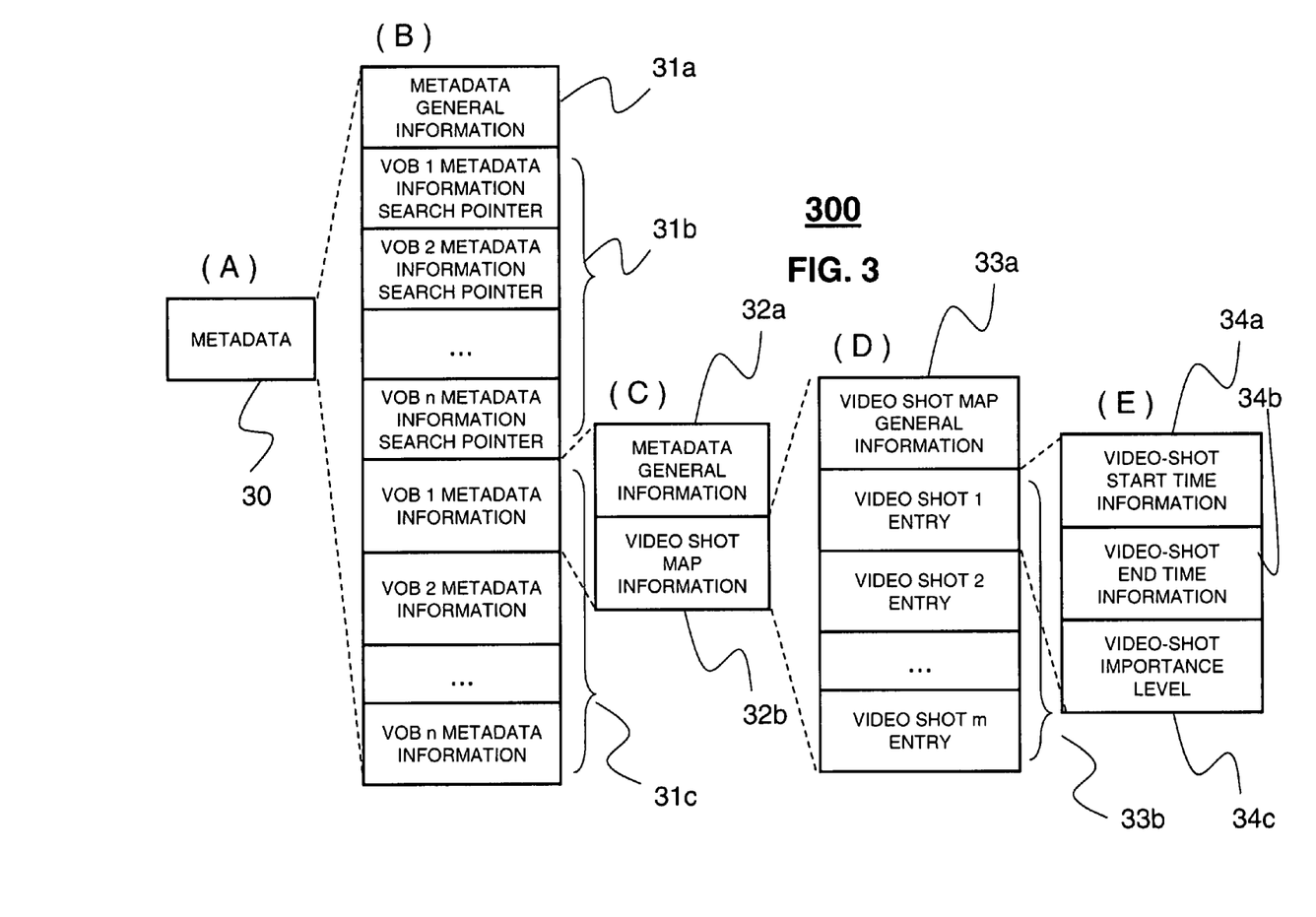
FIG. 3 is a block diagram of a data structure of a metadata file according to the invention.

FIG. 3 shows the hierarchical structure 300 of the metadata files 26. There are five levels A-E in the hierarchy, including metadata 30 at a highest level, followed by management information 31, general information 32, shot information 33, and index and importance information 34.

The metadata managing information 31 at level B includes a comprehensive description 31a of the overall metadata 30, video object (VOB) metadata information search pointer entries 31b, and associated VOB information entries 31c. The associations do not need to be one-to-one, for instance, there can multiple pointers 31b for one information entry 31c, or one information entry for multiple VOBs, or none at all.

At the next level C, each VOB information entry 31c includes metadata general information 32a, and video shot map information 32b. The metadata general information 32a can includes program names, producer names, actor/actress/reporter/player names, an explanation of the content, broadcast date, time, and channel, and so forth. The exact correspondences are stored as a table in the general information entry 32a.

At the next level D, for each video shot map information entry 32b there is video shot map general information 33a, and one or more video shot entries 33b. As above, there does not need to be a one-to-one correspondence between these entries. The exact correspondences are stored as a table in the general information entry 33a.

At the next level E, for each video shot entry 33b, there are start time information 34a, end time information 34b, and an importance level 34c. As stated above, frame numbers can also index the multimedia. The index information can be omitted if the index data can be obtained from the video shot reproducing time information 34a. Any ranking system can be used for indicating the relative importance. As stated above, the importance level can be continuous and content independent. The importance level can be added manually or automatically.

Multimedia Indexing

Figure 4:
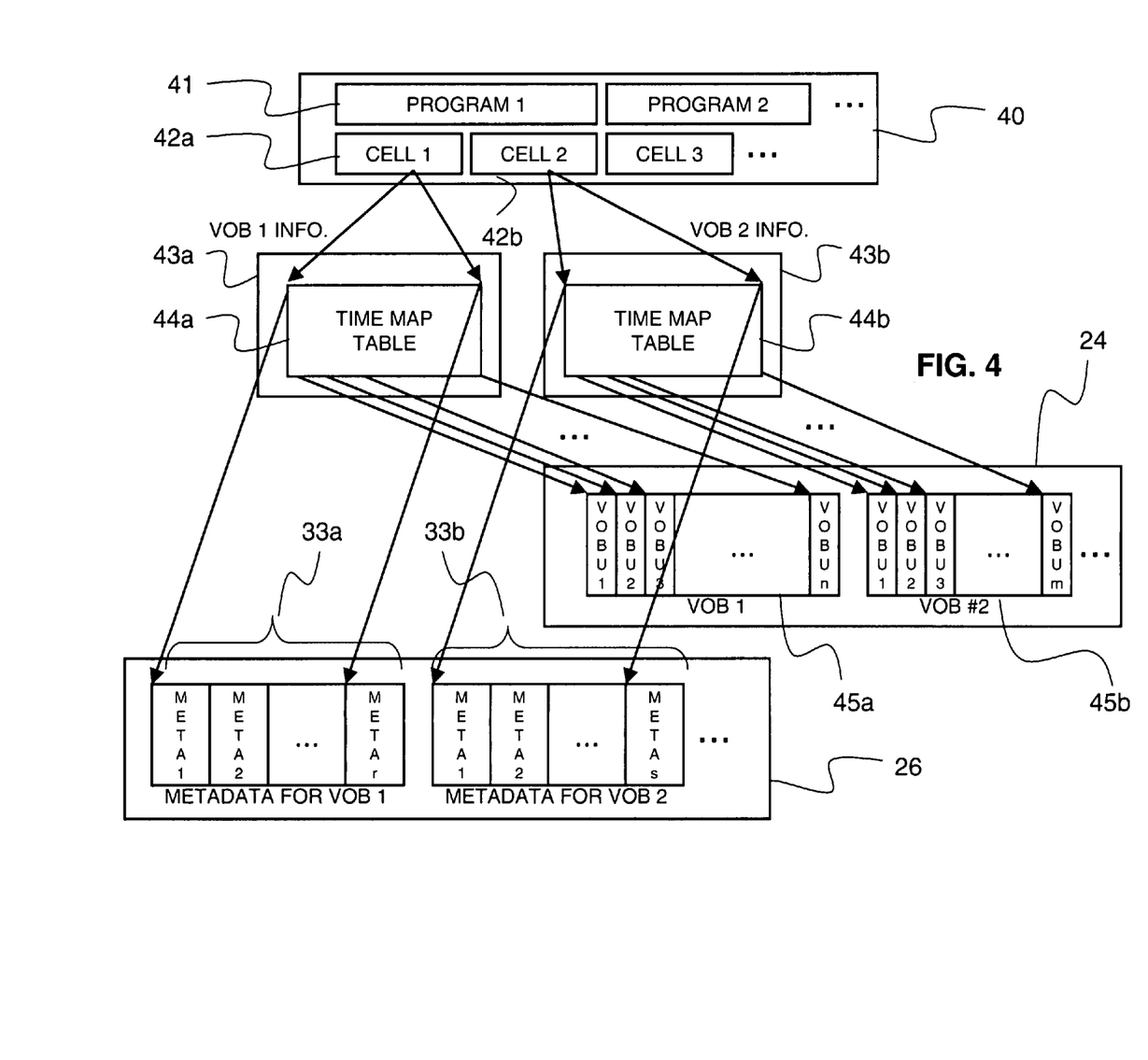
FIG. 4 is block diagram of indexing the multimedia according to the invention using the metadata file.

FIG. 4 shows the relationship between the multimedia recorded and reproduced according to the invention, and the metadata. Program chain information 40 stored in the management information file 23 describes a sequence for reproducing multimedia of a multimedia data file 24. The chain information includes programs 41 based on a reproducing unit as defined by the program chain information 40. Cells 42a-b are based on a reproducing unit as defined by the program 41. In digital versatile disk (DVD) type of media, a 'cell' is a data structure to represent a portion of a video program.

Video object information 43a-b describes a reference destination of the actual video or audio data corresponding to the reproducing time information, i.e., presentation time, designated by the cell 42 described in the management information file 23.

Map tables 44a-b are for offsetting the reproducing time information defined by the VOB information 43 and converting the same into actual video data or audio data address information. Video object units (VOBU) 45a and 45b describe the actual video or audio data in the multimedia data file 24. These data are multiplexed in a packet structure, together with the reproducing time information. The VOBUs are the smallest units for accessing and reproducing the multimedia. A VOBU includes one or more group-of-pictures (GOP) of the content.

Importance Threshold Based Reproduction

Figure 5:
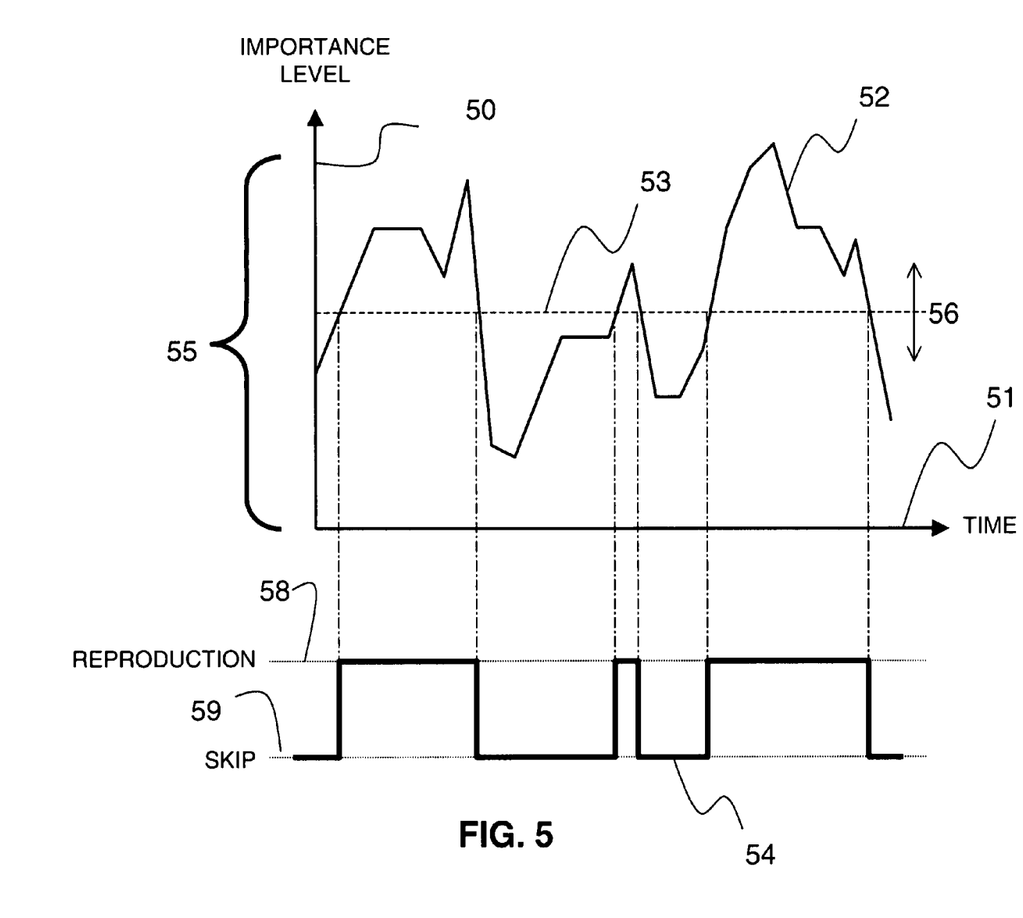
FIG. 5 is a graph representing an abstractive reproduction according to the invention.

FIG. 5 shows the abstractive reproduction according to the invention, where the horizontal axis 51 defines time and the vertical axis 50 defines an importance level. As shown in FIG. 5, the importance level varies continuously over a closed interval 55, e.g., [0, 1] or [0, 100]. Also, as shown, the importance level threshold 53 can be varied 56 by the viewer over the interval 55.

The time is in terms of the video-shot start time information 34a and the video-shot end time information 34b of FIG. 3. The importance is in terms of the video-shot importance level 34c. An example importance curve 52 is evaluated according to an importance threshold 53.

During a reproduction of the multimedia, portions of the multimedia that have an importance greater than the threshold 53 are reproduced 58 while portions that have an importance less than the threshold are skipped 59. The curve 54 indicates the portions that are included in the reproduction. The reproduction is accomplished using the reproducing control section 16 based on the metadata information obtained from the metadata analyzing section 15.

It should be noted that multiple continuous importance levels, or one or more importance level ranges can be specified so that only segments having a particular importance according to the real number values in the importance ranges are reproduced. Alternatively, only the least important segments can be reproduced.

To reproduce a desired program, the information management file 23 is read by the reader drive 10. This allows one to determine that the program is configured as, e.g., two cells.

Each cell is described by a VOB number and index information, e.g., a start and end time. The time map table 44a for the VOB1 information 43a is used to convert each presentation time to a presentation time stamp (PTS), or address information in the VOB1 concerned, thus obtaining an actual VOBU 45.

Likewise, the cell-2 42b is also obtained with a VOBU 45b group of VOB2 by the use of a time map table 44b of VOB2 information 43b. In this example, a cell, in this case, cell 42b, is indexed by the VOB 43b using the time map table 44b.

The data of the VOBUs 45 are provide sequentially for demuliplexing and decoding. The video signal 17 and the audio signal 18 are synchronized using the presentation time (PTM) and provided to the output device 19.

When the viewer selects a desired program e.g. program 1 41, the cells 42a-b that contain the configuration of the relevant program 41 can be found by the program chain information 40. The program chain information is thus used to find the corresponding VOB as well as the presentation time (PTM).

The metadata 26 described in FIG. 4 is used as follows, and as illustrated in FIG. 3. First, the metadata information management information 31a is used to locate the metadata information search pointer 31b corresponding to the desired VOB number. Then, the search pointer 31b is used to locate the VOB metadata information 31c. The VOB metadata includes video shot map information, which in turn includes the start time, stop time and importance level of each of the video shots. Thus, the VOB metadata is used to collect all the shots that have a presentation time (PTM) included in the range specified by the start time and end time of the cell, as well as their corresponding importance levels. Then, only those portions that exceed the desired importance level 53 are retained.

It should be noted that multiple programs can be selected for reproduction, and any number of techniques are possible to concatenate only the reproduced segments.

Alternative Abstractive Reproduction

Figure 6A:
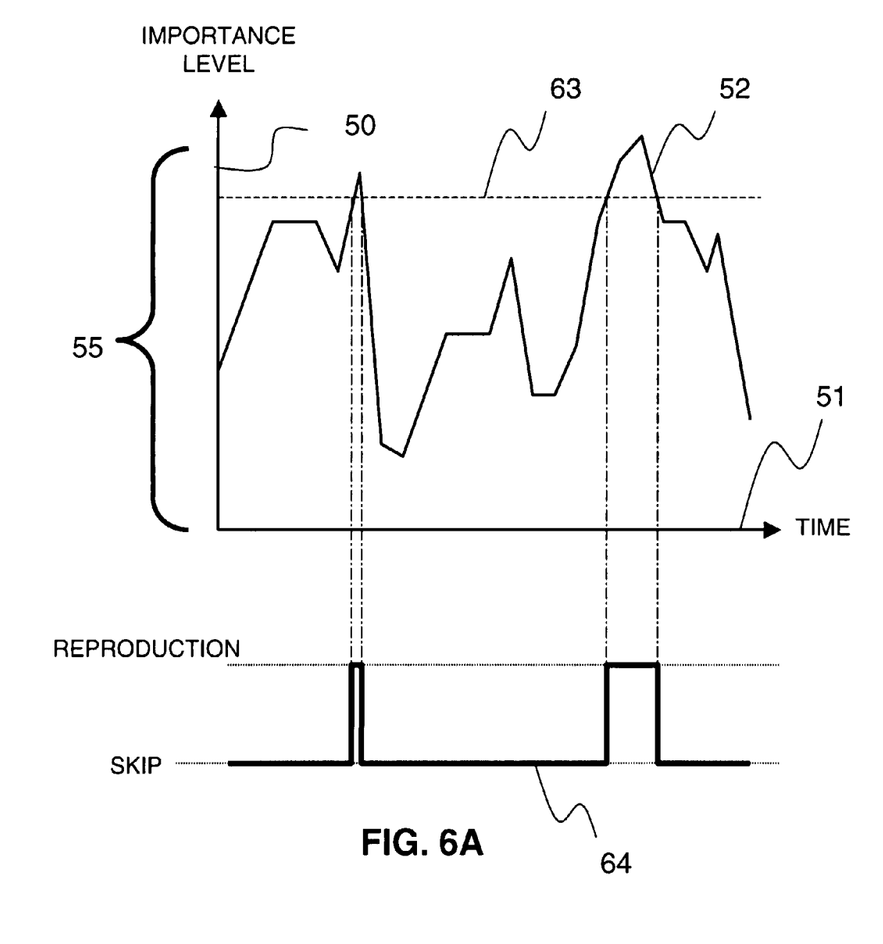
FIGS. 6A is a graph of an alternative abstractive reproduction according to the invention.

FIG. 6A shows an alternative abstractive reproduction according to the invention, where the vertical axis 50 defines an importance level, the horizontal axis 51 defines time, and the continuous curve 52 indicates importance levels. Line 63 is an importance level threshold, and line 64 a reproduction for only those segments that have a particular importance greater than the threshold. Other segments are skipped.

Abstraction Ratio

Figure 6B:
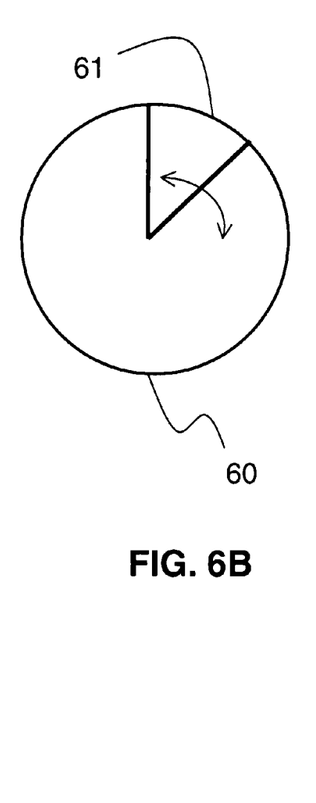
FIG. 6B is a graphics image representing an abstraction ratio.

FIG. 6B shows an abstraction ratio 60. The abstraction ratio can vary, e.g., from 0% to 100%, i.e., over the entire interval 55. The abstract ratio is shown as a graphics image superposed on an output image on the output device 19, which can be a playback device. A portion 61 is a current abstraction ratio that is user selectable. The threshold 63 is set according to the user selectable current abstraction ratio 61. The user can set the abstraction ratio using some input device, e.g., a keyboard or remote control 17a, see FIG. 1. If the abstraction ratio is 100%, then the entire multimedia file is reproduced, a ratio of 50% only reproduces half of the file. The abstraction ratio can be changed during the reproduction. It should be noted, that the graphics image can have other forms, for example, a sliding bar, or a numerical display in terms of the ratio or actual time. Alternatively, the abstraction ratio can be varied automatically by the metadata analyzing section 15 or the reproducing control section 16.

It should be noted, that pointers to the video segments can be sorted in a list according to a descending order of importance. Thus, it is possible to obtain a summary of any desired length by going down the list in the sorted order, including segments until a time length requirement is met.

Recording System Structure

Figure 7:
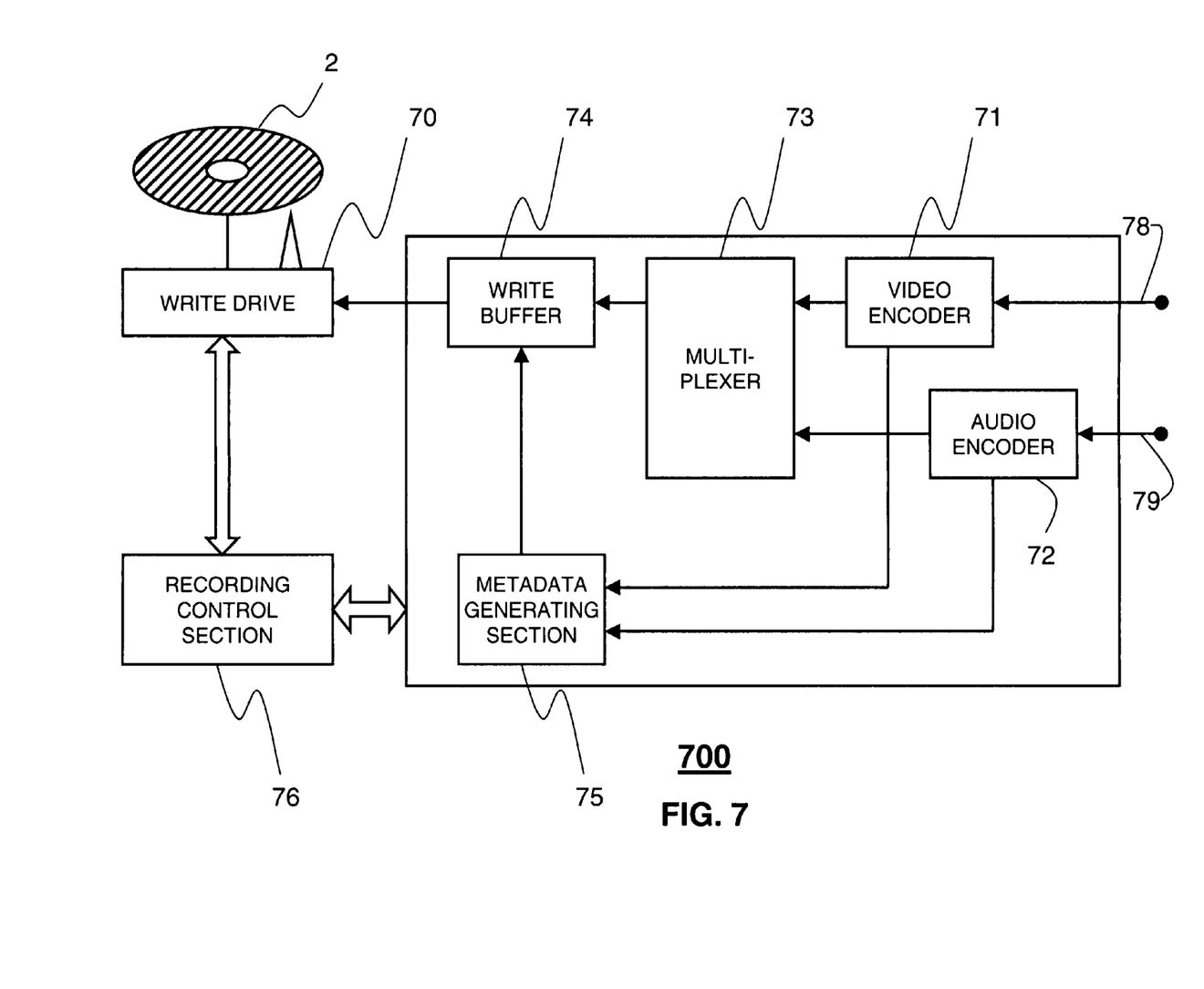
FIGS. 7 is a block diagram of a system for recording compressed multimedia files and metadata files on a storage media according to the invention.

FIG. 7 shows a block diagram of a system 700 for recording compressed multimedia files and metadata files on storage media 2, such as a disc or tape. The system includes a video encoder 71 and an audio encoder 72, which take as input video signals 78, audio signals 79, text, images, binary data, and the like. The outputs of the encoder are multiplexed 73 and stored temporarily in a write buffer 74 as multimedia data. The outputs are also passed to a metadata generating section 75 which also writes output to the write buffer.

A write drive 70 then writes the multimedia and the metadata to the storage media 2 as files under control of a recording control section 76, which includes a processor. The files can be written in a compressed format using standard multimedia compression techniques such as MPEG and AC-3. Encryption can also be used during the recording. It should be noted that the metadata generating section 75 can be implemented as software incorporated in recording control section 76.

The encoders extract features from the input signals 78-79, e.g., motion vectors, a color histograms, audio frequencies, characteristics, and volumes, and speech related information. The extracted features are analyzed by the metadata generating section 75 to determine segments and their associated index information and importance levels.

Windowed Importance Level

Figure 12:
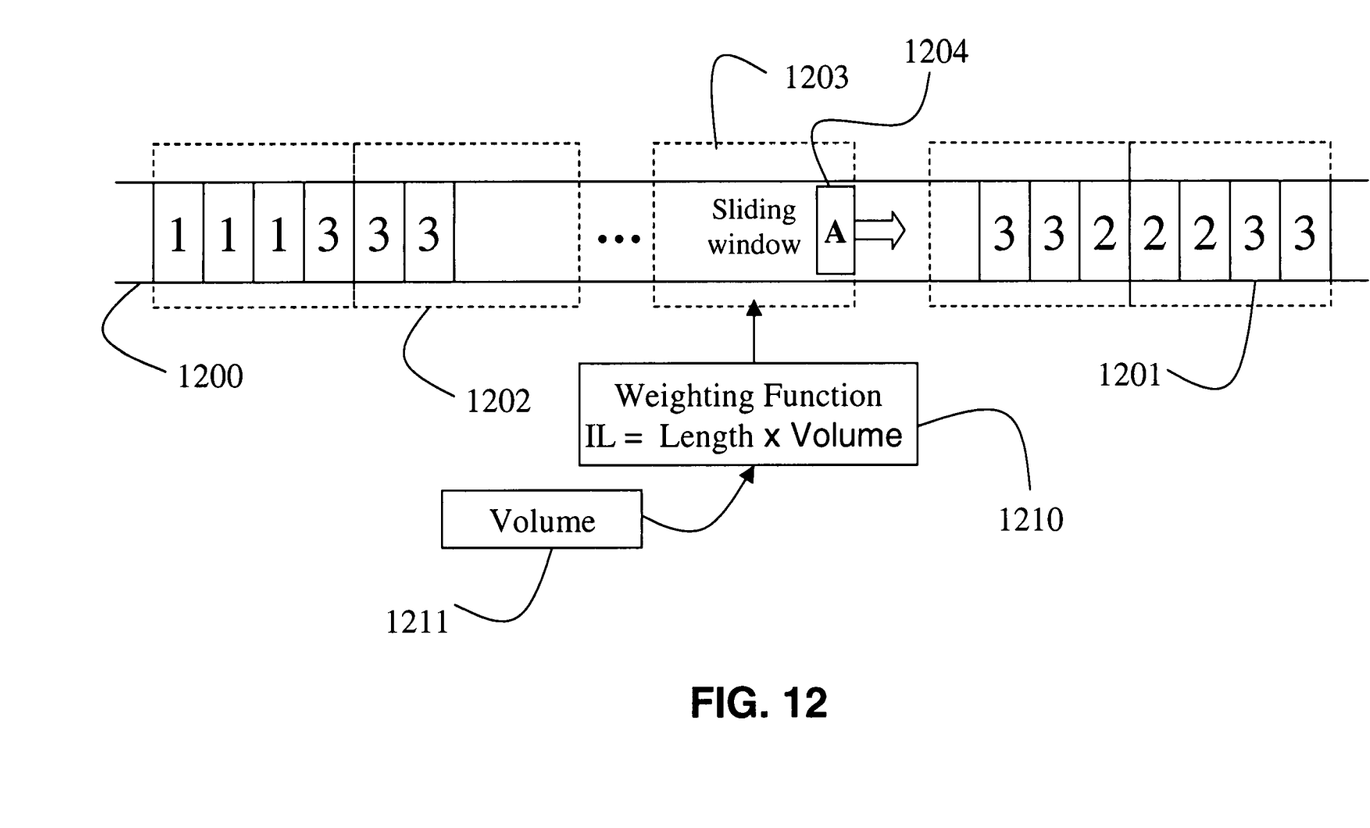
FIG. 12 is a block diagram of multimedia content partitioned into windows.

For example, as shown in FIG. 12, the importance levels can be determined by using the audio signal. For example, the audio volume for each segment 1201 can be used, and furthermore, the audio signal for each segment can be classified into various classes, such as speech, music, cheering, applause, laughter etc. In this case, the entire content 1200 is partitioned into non-overlapping segments 1201, e.g., 1 second duration. Applause and cheering can be given a higher importance level than speech and music.

After segments 1201 are classified, a possible way to locate highlights is to partition the content into equal duration segments 1201, or windows 1202. If windows are used, each window contains multiple classified segments as shown.

Next, the importance level of each window can be computed by finding a maximum length of uninterrupted or contiguous applause and/or cheering in the window, or by finding a percentage of applause and/or cheering in the window. All the segments in the window can be given the importance level of the window.

Another windowing scheme uses a fixed duration sliding window 1203 over the entire content, e.g., 12 seconds. The sliding window includes an 'anchor' segment, for example, the, first, middle, or last segment in the window. The window can slide forward one segment at the time. Then, the importance of the anchor segment (A) 1204 of the window is based on the percentage of applause and/or cheering or length of contiguous applause and/or cheering in the entire sliding window. The sliding window approach enables more precise temporal location of highlights.

Weighted Importance Level

Furthermore, the importance level (IL) obtained through the above strategies can be further weighted 1210 by a factor, e.g., the audio volume, 1211, of the window to get the final importance level. Thus, for instance, if a segment contains a lot of low volume applause, then the segment receives a relatively low importance level, whereas a segment with very loud applause receives a relatively high importance level.

It should be noted that, for any implementation, the multimedia files and the metadata files do not need to be generated concurrently. For example, the metadata can be generated at later time, and metadata can be added incrementally over time.

Time Threshold Based Reproduction

Figure 8:
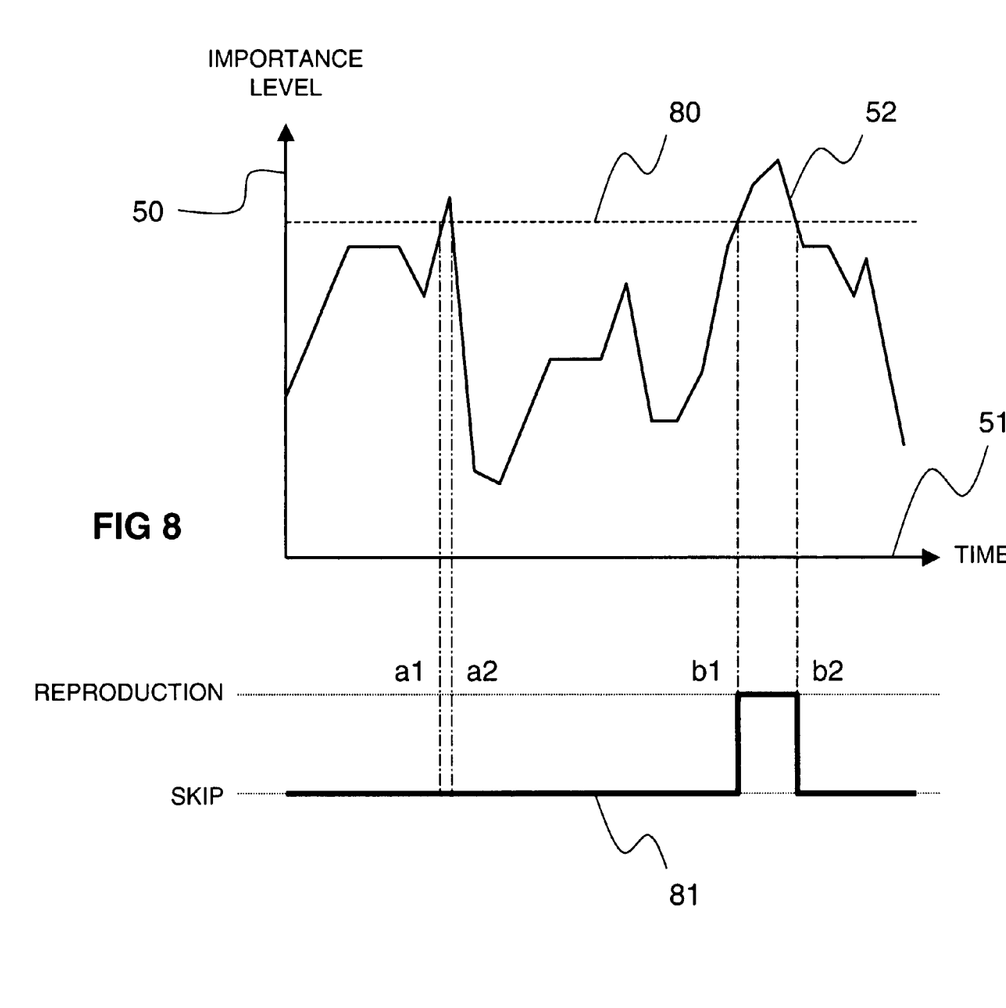
FIG. 8 is a graph of an alternative abstractive reproduction according to the invention.

FIG. 8 shows an alternative reproduction according to the invention in an abstract manner where the vertical axis 50 defines an importance level, the horizontal axis 51 defines time, and the continuous curve 52 indicates importance levels over time. Line 80 is a variable importance level threshold, and line 81 a reproduction for only those segments that have a particular importance greater than the threshold. Other segments are skipped.

However, in this embodiment, a time threshold is also used. Only segments that have a particular importance level greater than the importance level threshold and maintain that importance level for an amount of time that is longer than the time threshold are reproduced. For example, the segment a1 to a2 is not reproduced, while the segment b1 to b2 is reproduced. This eliminates segments that are too short in time to enable the viewer to adequately comprehend the segment.

Time Threshold Based Reproduction with Additive Segment Extension

Figure 9:
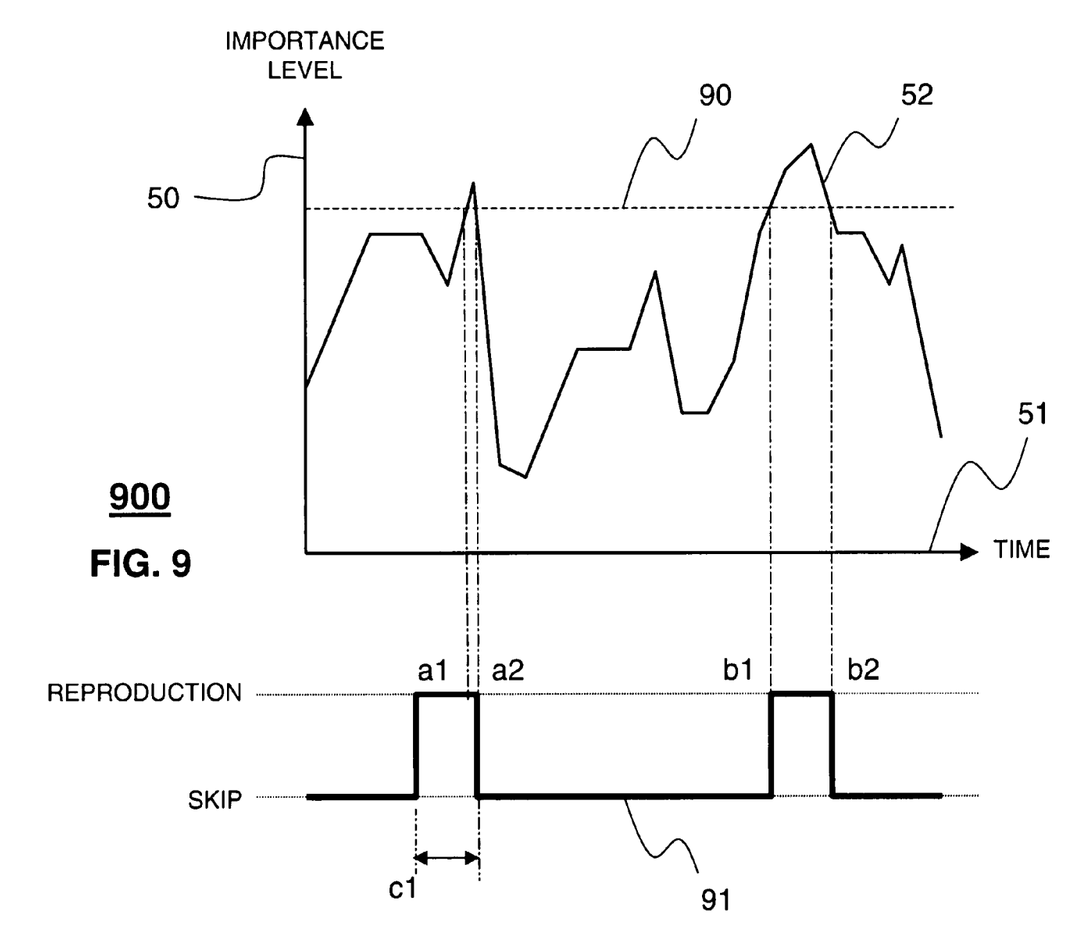
FIG. 9 is a graph of an alternative abstractive reproduction according to the invention.

FIG. 9 shows an alternative reproduction 900 according to the invention in an abstract manner where the vertical axis 50 defines an importance level, the horizontal axis 51 defines time, and the curve 52 indicates importance levels over time. Line 90 is an importance level threshold, and line 91 a reproduction for only those segments that have a particular importance greater than the threshold. Other segments are skipped, as before. In this implementation, as well as alternative implementations described below, the amount of extension can vary depending on the decisions made by the reproduction control section.

This embodiment also uses the time threshold as described above. However, in this case, segments that are shorter in time than the time threshold are not skipped. Instead, such segments are time extend to satisfy the time threshold requirement. This is done by adding portions of the multimedia file before, after, or before and after, the short segments, for example, segment c1 to a2. Thus, the short segments are increase in size to enable the viewer to adequately comprehend the short segment. It should be noted, that a second time threshold can also be used, so that extremely short segments, e.g., single frames, are still skipped.

Time Threshold Based Reproduction with Multiplicative Segment Extension

Figure 10:
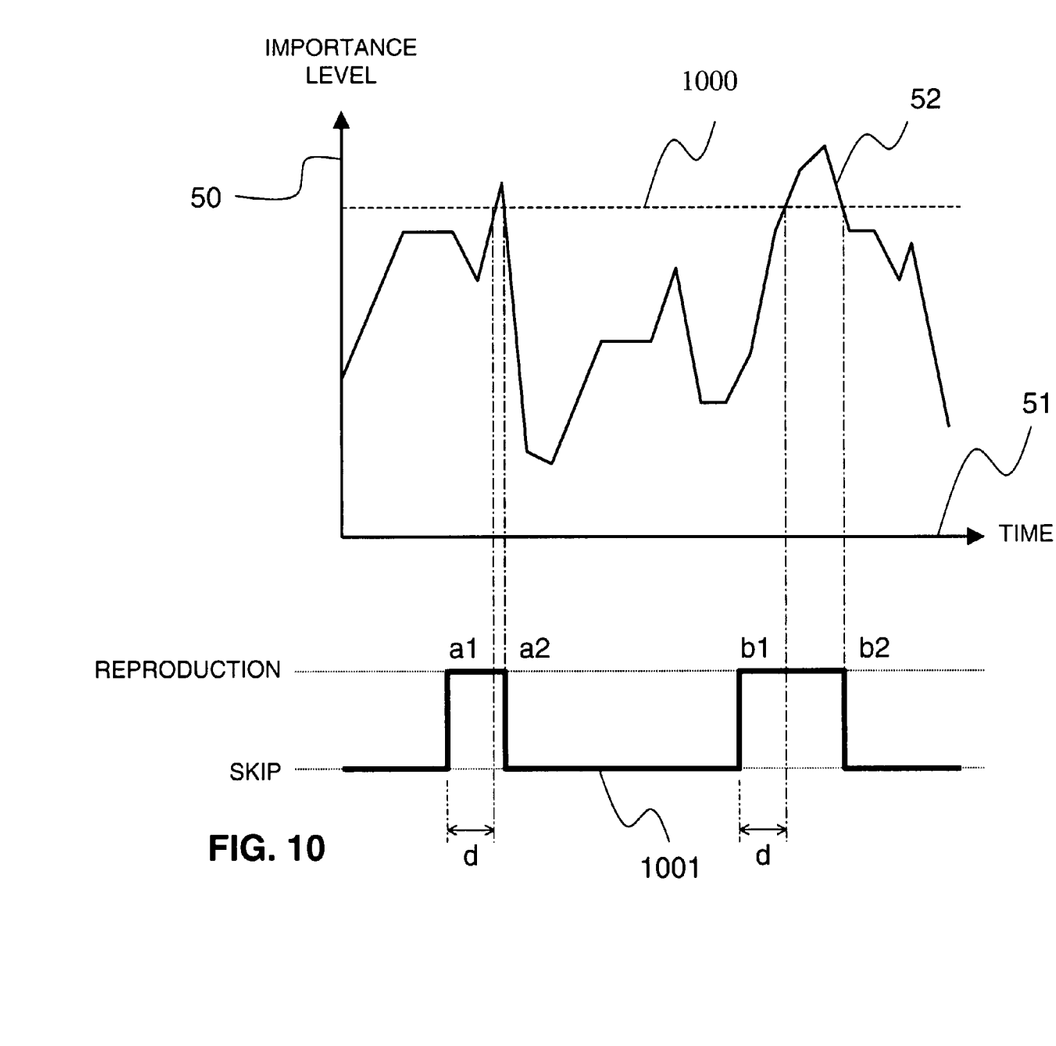
FIG. 10 is a graph of an alternative abstractive reproduction according to the invention.

FIG. 10 shows an alternative reproduction according to the invention in an abstract manner where the vertical axis 50 defines an importance level, the horizontal axis 51 defines time, and the curve 52 indicates importance levels over time. Line 1000 is an importance level threshold, and line 101 a reproduction for only those segments that have a particular importance greater than the threshold. Other segments are skipped.

This embodiment also uses the time threshold as described above. However, in this case, the time of the segments are increased by a predetermined amount d to increase the size of the reproduced segments that satisfy the time threshold. As above, the segments can be extended before, after, or before and after. We can also use a multiplication factor to achieve the same lengthening of the time of the segments.

Recording and Reproducing System Structure

Figure 11:
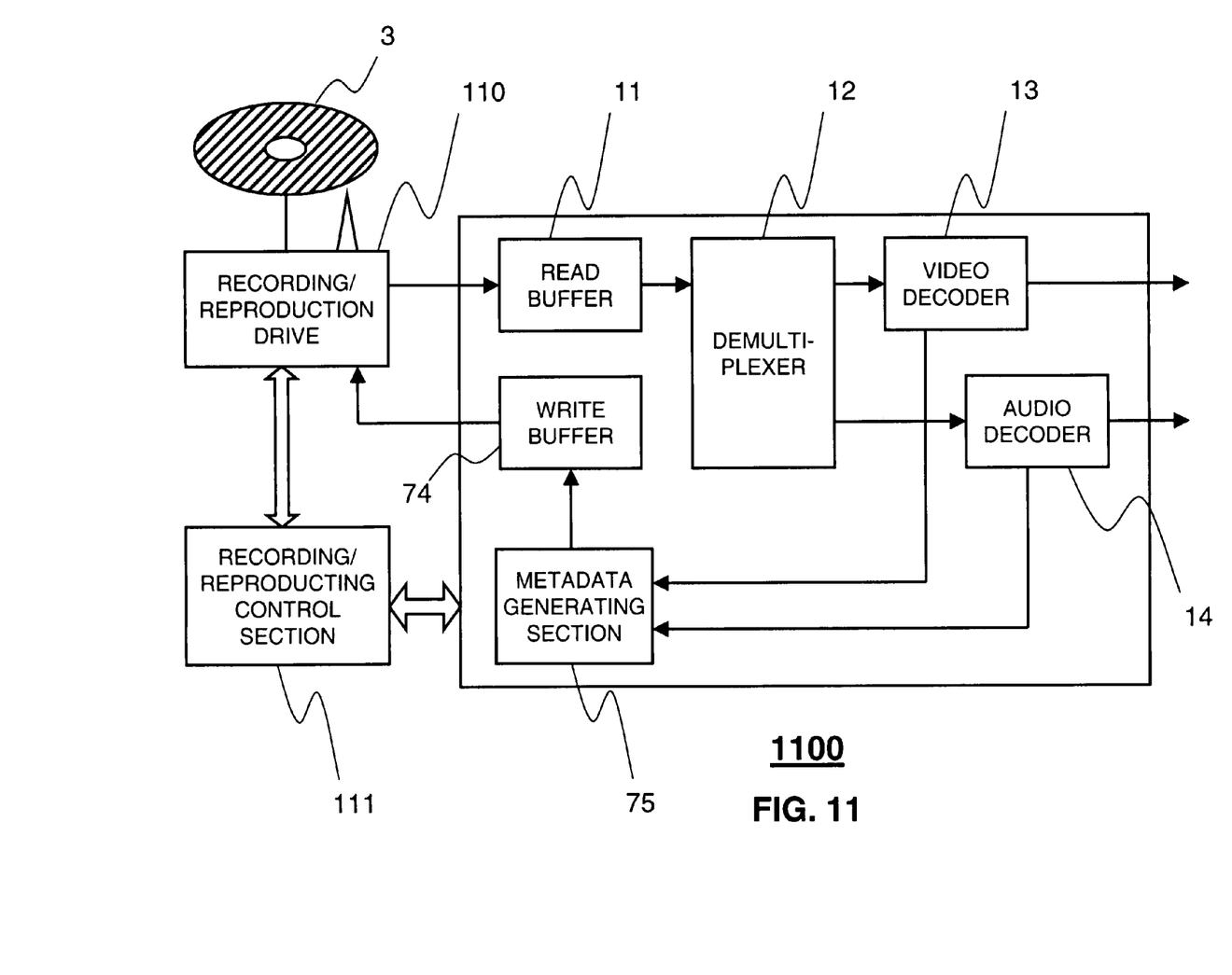
FIG. 11 is a block diagram of a system for recording multimedia according to the invention.

FIG. 11 shows a block diagram of a system 1100 for recording and reproducing compressed multimedia files and metadata files stored on read/write storage media 3, such as a disc or tape.

A read/write drive 110 can write data to the read buffer 11 and read data from the write buffer 74. The demultiplexer 12 acquires, sequentially, multimedia from the read buffer, and separates the multimedia into a video stream and an audio stream. The video decoder 13 processes the video stream, and the audio decoder 14 processes the audio stream. However, in this case, the metadata generating section 75 also receives the outputs of the decoders 13-14 so that the reproduced multimedia can be persistently stored on the storage media 3 using a recording/reproducing control section 111.

It should be noted that the importance level, indexing information and other metadata can also be extracted from the video and/or audio data during the decoding phase using the metadata generating section 75.

Furthermore, the importance level, indexing information and other metadata can also be generated manually and inserted at a later stage.

It should be noted that any of the above implementations can include a search function, to enable the viewer to directly position to particular portion of the multimedia based either on time, frame number, or importance. The search function can use 'thumbnail' segments, for example a single or small number of frames to assist the viewer during the searching.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for summarizing multimedia, comprising:
   storing a compressed multimedia file partitioned into a sequence of segments;
   storing a metadata file including index information and an importance level for each segment in the sequence, the importance level being continuous over a closed interval, and the importance level based on an audio signal of the multimedia file;
   selecting an importance level threshold in the closed interval;
   summarizing the multimedia file according to the index information, the importance level and the importance level threshold;
   sliding a window over the multimedia file in a forward direction, the sliding window including a plurality of the segments, and an anchor segment in a fixed relationship with respect to the window while sliding the window;
   determining the importance level for the sliding window from the importance levels of the segments in the window; and
   assigning the importance level of the window to the anchor segment in the window while sliding the window.

2. The method of claim 1, further comprising:
   partitioning the multimedia file into a plurality of fixed length and non-overlapping windows, each window including a plurality of the segments; and
   determining the importance level for each window from the importance levels of the segments in each window; and
   assigning the importance level of each window to each segment in the corresponding window.

3. The method of claim 1, further comprising:
   weighting the importance level by a factor.

4. The method of claim 3, in which the factor is an audio volume.

5. The method of claim 4, further comprising:
   normalizing the audio volume.

6. The method of claim 1, further comprising:
   classifying the audio signal in each segment;
   determining an audio volume for each segment; and
   determining the importance level based on the audio classification and the audio volume.

7. An apparatus for summarizing multimedia, comprising:
   storage for storing a compressed multimedia file partitioned into a sequence of segments, and a metadata file including index information and an importance level for each segment in the sequence, the importance level being continuous over a closed interval, and the importance level based on an audio signal of the multimedia file;
   unit for selecting an importance level threshold in the closed interval;
   unit for reproducing the multimedia file according to the index information, the importance level and the importance level threshold;
   unit for sliding a window over the multimedia file in a forward direction, the sliding window including a plurality of the segments, and an anchor segment in a fixed relationship with respect to the window while sliding the window;
   unit for determining the importance level for the sliding window from the importance levels of the segments in the window; and
   unit for assigning the importance level of the window to the anchor segment in the window while sliding the window.

8. A disc recorder, comprising:
   recorder for recording an inputted video signal or audio signal on a predetermined recording medium;
   unit for dividing the video signal or audio signal into predetermined segments to extract a feature from the video signal or a feature from the audio signal for each segment;
   unit for generating metadata including feature data corresponding to the features and start positions of the segments, in which the recorder records the metadata on the recording medium in association with the segments, the unit for generating generates the feature data corresponding to all the segments within a predetermined window based on the feature data of the respective segments included in the window, and the window includes an anchor segment in which predetermined feature data is set; and
   unit for generating the feature data corresponding to all the segments within a predetermined window based on the feature data of the respective segments included in the window and the feature data set in the anchor segment.

9. The disc recorder according to claim 8, wherein the unit for generating applies weighting to the feature data.

10. The disc recorder according to claim 9, characterized in that the weighting is a volume of audio corresponding to the audio signal.

* * * * *